US005912625A

United States Patent [19]

Scofield

[11] Patent Number: 5,912,625

[45] **Date of Patent: *Jun. 15, 1999**

[54] WAVE SENSOR CONTROL SYSTEM

[76] Inventor: John H. Scofield, 328 Reamer Pl., Oberlin, Ohio 44074

[ * ] Notice: This patent issued on a continued prosecution application filed under 37 CFR 1.53(d), and is subject to the twenty year patent term provisions of 35 U.S.C. 154(a)(2).

[21] Appl. No.: 08/857,514

[22] Filed: May 16, 1997

[51] Int. Cl.[6] .............................. E05F 15/20; G05B 9/02

[52] U.S. Cl. .................................. 340/665; 49/26; 49/27; 49/28; 340/540; 340/541; 367/93

[58] Field of Search .................................... 340/540, 665, 340/666, 541; 49/26, 27, 28; 367/93

[56] References Cited

U.S. PATENT DOCUMENTS

| | | | |
|---|---|---|---|
| 4,396,814 | 8/1983 | Miller . | |
| 4,439,894 | 4/1984 | Schwiers et al. . | |
| 4,621,452 | 11/1986 | Deeg . | |
| 4,914,859 | 4/1990 | Gionet et al. . | |
| 5,079,417 | 1/1992 | Strand | 49/26 |
| 5,203,110 | 4/1993 | Hormann . | |
| 5,228,492 | 7/1993 | Jou | 49/26 |
| 5,399,851 | 3/1995 | Strand | 250/222.1 |
| 5,566,504 | 10/1996 | Pitel . | |
| 5,629,681 | 5/1997 | DuVall et al. | 340/665 |
| 5,646,615 | 7/1997 | Moore | 340/665 |
| 5,728,984 | 3/1998 | Miller | 200/61.43 |
| 5,780,985 | 7/1998 | Bickley et al. | 49/28 |

*Primary Examiner*—Glen Swann
*Attorney, Agent, or Firm*—Young & Basile, P.C.

[57] ABSTRACT

A control system utilizes generated acoustic or electromagnetic waves within a deformable wall wave guide. The wave guide is located in the surveillance area and, upon the wave guide being deformed by an obstruction or an intruder, the characteristics of the wave within the change. The change is sensed by a receiver which produces a control signal to activate an alarm and/or an operating system if the control system is used to control moving elements, such as a door or gate. The wave guide can constitute a homogeneous portion of door weatherstripping.

1 Claim, 2 Drawing Sheets

WAVE SENSOR CONTROL SYSTEM

BACKGROUND OF THE INVENTION

1. Field of the Invention

The invention pertains to safety control systems utilizing acoustic or electromagnetic waves to produce a control signal.

2. Description of the Related Art

It is known to use surveillance devices which actuate to produce a control signal when an elastomeric hose is deformed. For instance, devices for sensing pedestrian traffic, the entering of a vehicle into a service station, or the counting of traffic flow, may employ an elastomeric hose extending across the area to be surveyed whereby deformation of the hose compresses air therein to momentarily produce an increase in air pressure which is sensed to activate a control system, such as an alarm or counter. Such devices are susceptible to a wide variety of malfunctions.

Sensors employing deformable walls require a sudden and significant compression of the hose to produce a signal, and because the signal is very short, and possibly very weak, it is not uncommon for a signal to go undetected.

A very common surveillance area is a door or gate which may include pedestrian or vehicular traffic. For instance, a garage door opening provides passage for both vehicles and pedestrians, and garage doors are commonly operated by motor driven actuators. Because of the danger to a pedestrian, particularly a child, located within a garage doorway during door closing, a variety of safety devices have been proposed to prevent injury. For instance, pressure sensors may indicate the encountering of the door with an obstruction which produces an abnormal resistance to door movement which is sensed by the door actuator to reverse door movement. Also, it is known to utilize photoelectric devices within the doorway which prevent the door from closing in the event the light path of the photoelectric system is interrupted.

Previous safety systems utilizing pressure sensing, photoelectric light sensing, and the like, have a number of deficiencies such as those mentioned above, and further including alignment with respect to photocell devices and a high sensitivity to possible damage. Accordingly, there is a need for a more dependable sensing system for a surveillance area than is presently available.

OBJECTS OF THE INVENTION

It is an object of the invention to provide a control system for sensing the presence of an obstruction or intruder which utilizes acoustic or electromagnetic waves wherein the system is highly sensitive, self-monitoring and relatively economical to produce.

Another object of the invention is to provide a sensor system for use with actuating or control systems for prime movers, such as electric motors and the like wherein waves transmitted through a flexible wall wave guide located within the area under surveillance is utilized, and deformation of the wave guide is immediately sensed by a receiver to appropriately control the prime mover, such as a door operator.

Yet another object of the invention is to provide a safety system for electrically operated doors and the like which is of relatively low cost, dependable in operation, aesthetically pleasing, and which does not require the mounting of sensors in locations subjecting them to possible damage.

A further object of the invention is to provide a control system for electrically operated doors and the like wherein a wave guide is mounted upon the leading edge of the closing door and is formed of an elastomeric material to permit deforming when engaging an obstacle, and such deformation is subsequently sensed to reverse the direction of door movement.

Yet an additional object of the invention is to provide a control system for electrically operated doors wherein waves are transmitted through a flexible walled wave guide which, in addition to functioning as a wave guide, also functions as weatherstripping to seal the edge of the door to the floor or its opening.

SUMMARY OF THE INVENTION

While the safety control system of the application is suitable for use with electrical motor driven doors and other devices, the principles of the invention may be utilized in a variety of situations where an area is to be maintained under surveillance and a control signal is to be generated upon the wave guide being deformed. Accordingly, the concepts of the invention can be utilized with a variety of security systems or could be employed to provide a counting or alerting signal such as used in automobile service stations to alert the attendant, or as used on highways to count passing vehicles.

The invention may be implemented using a variety of acoustic (sound or ultrasound) or electromagnetic (e.g., light, infrared, ultraviolet, radio) waves. For purpose of illustration, the remaining discussion will refer to ultrasonic waves with the understanding that similar results may be achieved with other kinds of waves.

Basically, the control system utilizes an ultrasonic wave transmitter connected to an ultrasonic wave receiver or sensor through a deformable wall wave guide. The wave guide is located above or adjacent the area under surveillance whereby upon the wave guide encountering an obstacle, or an obstacle moving over the wave guide, the wave guide will be deformed from its "normal" configuration which will change the characteristic of the ultrasonic wave passing therethrough. This change in ultrasonic wave characteristic is sensed by the receiver and a control signal is immediately generated for stopping and reversing an electric motor, or producing an electronic signal for any desired purpose.

Preferably, the wave guide is formed of an elastomeric material, such as neoprene, rubber, vinyl, composite or other similar composition, and the wave guide passage may be of a cylindrical, elliptical, rectangular or other irregular shape defining a longitudinal passage within the flexible material. The wave guide is usually attached to the leading edge of an automatic door wherein upon the wave guide engaging the garage floor, jamb or door threshold, the wave guide will function in the normal manner of an elastomeric weather seal.

As will be appreciated from the following description, the basic concept of the invention as described above may take a number of forms. The transmitter and receiver may be spaced from each other, or the transmitter and receiver may be located in close proximity and the wave guide may either take the form of a separate loop, or a double passage may be defined in a weatherstripping wave guide. Also, it is envisioned that the transmitter and receiver be located adjacent each other, or constitute a transceiver wherein an ultrasonic wave reflector is located remotely from the transceiver and reflects the ultrasonic wave back through the same wave guide through which the wave was transmitted. Deformation of the wave guide in such instance will vary the characteristics of the wave moving in either direction, and such change is subsequently sensed by the transceiver to produce a control signal.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENTS

As mentioned above, the inventive concepts of the safety control system of the invention may be utilized with applications other than as a control system for an electric motor operated garage door. However, the invention is readily understood in the garage door environment and will be so explained in the illustrated embodiments.

Figure 1:
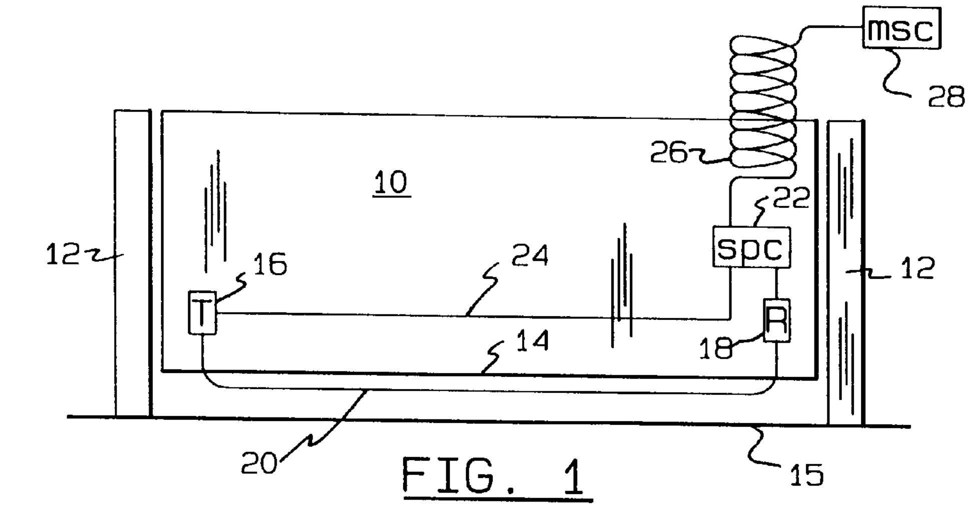
FIG. 1 is an elevational schematic illustration showing the basic relationship of the components of the invention as utilized with a vertically movable electric motor operated door.

In FIG. 1, a garage door is generally indicated at 10. The garage door will usually consist of a plurality of elongated panels hingedly interconnected along their horizontal sides, and roller guides, not shown, extending from the ends of the door panels cooperate with the vertical door guides 12 whereby the door may be raised and lowered with respect to the guides 12 in the well known manner. The door 10 includes the leading or bottom edge 14 which is located adjacent the floor or door threshold 15 when the door is fully closed.

An ultrasonic or other type of wave transmitter or generator 16 is mounted on the door adjacent one edge of the door, while the wave sensing receiver 18 is mounted on the door adjacent the other door edge. The transmitter 16 and receiver 18 are each in communication with a tubular wave guide 20 located just below the door edge 14 and attached thereto. A signal processing circuit 22 is connected to the receiver 18, and is connected to the transmitter 16 through the electric cable 24. A flexible wire coil 26 interconnects the signal processing circuit 22 to the motor switch control 28. The switch control 28 is operatively connected to an electric motor and transmission unit, not shown, of conventional construction, which raises and lowers the door 10 in the well known manner upon being energized by the motor switch control 28.

The wave guide 20 is preferably formed of an elastomeric material and defines a passage whereby ultrasonic, sonic or electromagnetic waves transmitted from transmitter 16 are directed to the receiver 18. Because the wave guide 20 is located adjacent the door lower edge 14, any obstacle below the door edge 14 as the door 10 is lowered will first engage the wave guide 20. As the wave guide 20 is formed of a deformable material, such as rubber, plastic, or the like, engagement with an obstacle will compress the wall of the wave guide 20 changing the characteristics of the wave passing through the wave guide. This change in the characteristics of the wave guide is subsequently sensed by the receiver 18 which is connected to the signal processing circuit 22, and the circuit 22 immediately energizes the motor circuit switch 28 in such a manner as to stop the motor lowering the door 10, and the door control 28 will either stop the lowering of the door, or stop the door movement and reverse its direction so that the door moves away from the encountered obstacle.

Figure 2:
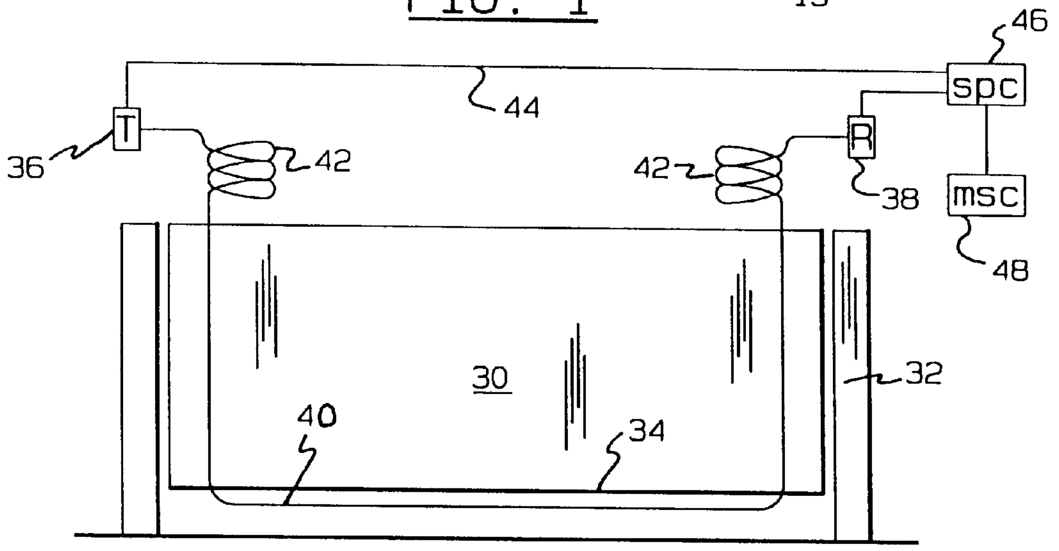
FIG. 2 is a schematic elevational illustration of another embodiment of the invention wherein the transmitter and receiver are stationarily mounted and coiled wave guides are used.

It will be appreciated that the coil 26 is for the purpose of accommodating the movement of the door 10, and in the embodiment of FIGS. 1 and 2, the transmitter 16 and receiver 18 will move with the door.

The embodiment shown in FIG. 2 stationarily mounts the transmitter and receiver, rather than having these components move with the door, and in FIG. 2, the door 30 is vertically displaced between the door guides 32. The door 30 includes the lower edge 34. The wave transmitter 36 is permanently mounted to the wall or garage structure adjacent one edge of the door 30, while the wave receiver 38 is located adjacent the other door edge. The flexible wall wave guide 40 is placed immediately below the door lower edge 34 and the wave guide is attached to the transmitter 36 and receiver 38 through wave guide coils 42 which will accommodate the vertical movement of the door in view of the fixed nature of the transmitter and receiver. Cable 44 connects the transmitter 36 to the signal processing circuit 46, and the circuit 46 is connected to the motor switch circuit 48.

As the door 30 raises and lowers, the transmitter 36 and receiver 38 remain stationary, but the wave guide 40 adjacent the door lower edge 34 moves up and down with the door as permitted by the wave guide coils 42. As in the previous embodiment, if the wave guide 40 encounters an obstacle in the path of the movement of the door edge 34, the deformation of the wave guide is sensed by the receiver 38 to stop door movement and reverse its direction of movement.

Figure 3:
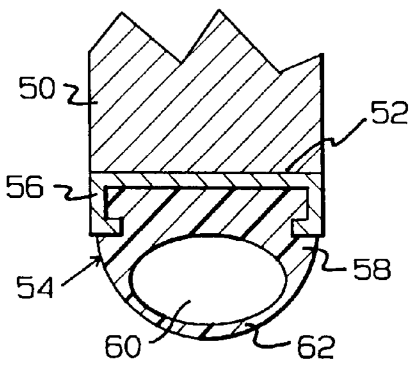
FIG. 3 is an enlarged detailed transverse cross sectional elevational view of a typical elastomeric wave guide also functioning as a weatherstrip as may be used with the embodiments shown in FIGS. 1 and 2.

In FIG. 3, a preferred type of wave guide is illustrated such as would be used with the embodiments of FIGS. 1 and 2.

With reference to FIG. 3, the door is illustrated at 50 having the lower edge 52. The wave guide is generally indicated at 54 and includes an extruded base plate 56 attached to the door edge 52. The wave guide includes an elastomeric body 58 such as formed of rubber, neoprene, urethane or the like, and includes a passage 60 having a transverse ellipsoidal configuration. The thin wall 62 located between the lowermost portion of the wave guide 54 and the passage 60 will be appreciated from the drawing and this thin wall will deform upon engagement with an obstacle and change the configuration of passage 60.

The wave guide 54 transmits the signals through the homogeneous passage 60. However, the wave guide 54 can serve as a weatherstrip along the door lower edge 52 as the wave guide will be firmly engaging the floor or threshold of the door.

By utilizing a wave guide 54 having a dual purpose, the inventive concepts may be economically practiced, and it will be appreciated that the wave guide 54 does not detract from the aesthetic appearance of the garage door 50.

Figure 4:
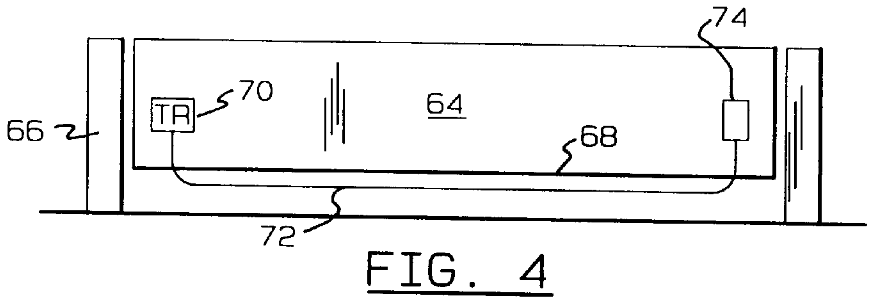
FIG. 4 is a schematic elevational view of another embodiment using the inventive concepts wherein the transmitter and receiver constitute a single transceiver unit and an ultrasonic wave reflector is employed to return the ultrasonic wave frequencies.

Another embodiment of the invention is illustrated in FIG. 4 wherein the door 64 is located between guides 66. The lower edge of the door 64 is indicated at 68, and a combination transmitter and receiver 70, commonly called a transceiver, is mounted upon the door 64. The wave guide 72 is located adjacent and below the door lower edge 68, and the outer end of the wave guide communicates with a sonic wave reflector 74.

With the embodiment of FIG. 4, a single passage wave guide, such as the wave guide 54 described with respect to FIG. 3, may be used. The transceiver 70 is capable of transmitting a wave through the wave guide 72 which is reflected back by the reflector 74. The transceiver 70 is capable of analyzing the reflected waves received, and the transceiver is initially adjusted so as to operate properly as long as the passage of the wave guide 72 is not deformed.

Upon the passage in wave guide 72 being deformed, the reflected wave passing through the wave guide will change its characteristics which is immediately sensed by the transceiver 70, and the transceiver 70 is connected to a signal processing circuit and motor switch circuit, not shown, similar to those already described. The embodiment of FIG. 4 permits the transmitter and receiver to be constructed as a single unit, and economies of manufacture are achieved with this embodiment.

Figure 5:
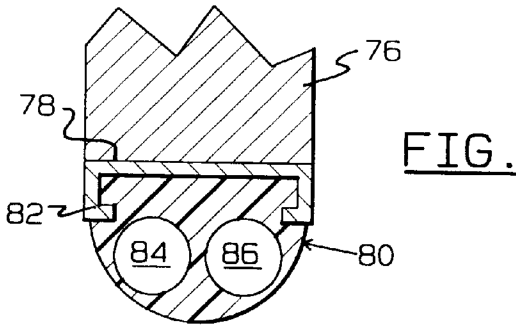
FIG. 5 is an enlarged detail elevational transverse sectional view of another embodiment of elastomeric wave guide also functioning as weatherstripping wherein two parallel wave guide passages are homogeneously defined therein.

FIG. 5 illustrates a different type of ultrasonic wave guide wherein a pair of ultrasonic wave transmitting passages are formed therein.

In FIG. 5, the door 76 includes the lower edge 78, and the wave guide 80 is attached to the door lower edge 78 by the extruded base 82. The elastomeric body of the wave guide 80 includes a pair of wave transmitting passages 84 and 86. Upon the lower portion of the wave guide encountering an obstacle, one or both of the passages 84 and 86 will be deformed varying the characteristics of the ultrasonic wave transmitted therethrough.

Figure 6:
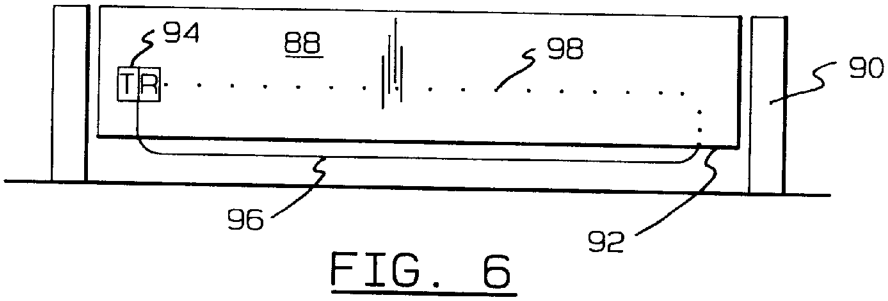
FIG. 6 is an elevational schematic view of another embodiment of the invention wherein the wave guide construction shown in FIG. 5 is utilized.

The wave guide embodiment of FIG. 5 may be used in the arrangement shown in FIG. 6 wherein the door 88 moves between the vertical guides 90. The lower edge of the door 88 is indicated at 92.

A combination wave transceiver 94 is mounted adjacent one edge of the door 88 and communicates with the double passage wave guide 96 located adjacent the door edge 92. The wave guide 96 may be identical to the wave guide 80 shown in FIG. 5, and at the right end of the wave guide 96, the passages equivalent to 84 and 86 are in communication. Accordingly, the wave is transmitted through the wave guide passage 84 which, in turn, communicates at the far end of the wave guide with the other wave guide passage 86 which is in communication with the receiving portion of the transceiver 94.

This embodiment simplifies installation and maintenance, and it will be appreciated that the transceiver 94 is in electrical connection with a signal processing circuit and motor switch control, not shown, similar to that previously described.

With respect to FIG. 6, if it is desired to only use a single passage wave guide, the wave guide 96 would take the form of that shown at 54 in FIG. 3, and the far end of the wave guide 96 would communicate with a non-active or non-deformable wave guide portion 98 connected to the receiving part of the transceiver 94. In this manner, the wave transmitted from the transmitter 94 passes through a loop back to the receiver.

Figure 7:
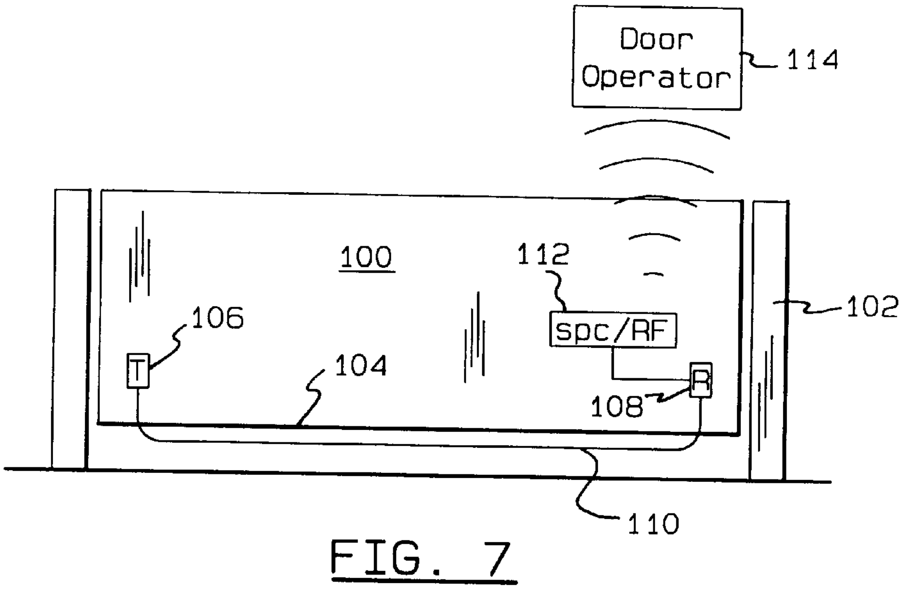
FIG. 7 illustrates a wireless embodiment of the invention wherein the control signals generated by the system are transmitted to the door operating mechanism by radio frequency or infrared signals.

In the embodiment of FIG. 7, the door 100 operates between door guides 102 and includes the lower edge 104. The wave transmitter 106 is located adjacent one edge of the door while the wave receiver 108 is located adjacent the other door edge, similar to that shown in FIG. 1. The receiver 108 is connected to the signal processing circuit 112 which includes a wireless transmitter which signals the door operator 114 controlling the electric motor and drive, not shown, raising and lowering the door 100. In this embodiment, the "hard"wired circuit connecting the motor switch control to the signal processing circuit is eliminated.

It will be appreciated from the above descriptions that the basic concepts of the invention may be utilized in a plurality of applications and installations, and it is intended that various embodiments of the invention as would be apparent to those skilled in the art be considered to fall within the scope of the invention. It will be appreciated that the concepts of the invention may be widely used in those situations wherein a sensor is desired to control the motion of an object, or an area is to be maintained under surveillance. A sensor constructed in accord with the invention is self-monitoring, and is dependable in operation substantially eliminating the likelihood of a moving door causing an injury.

I claim:

1. An overhead door motor control system for an overhead door having lateral edges and a bottom edge comprising, in combination, an ultrasonic wave transmitter mounted on the door adjacent one door lateral edge, an ultrasonic wave receiver mounted on the door adjacent the other door lateral edge, an elongated hollow flexible wall wave guide weatherstrip affixed to the door bottom edge interconnecting said transmitter and receiver whereby ultrasonic waves transmitted by said transmitter are received and sensed by said receiver, said receiver sensing variations in the wave characteristics of an ultrasonic wave longitudinally transversing said wave guide differing from a predetermined value upon said wave guide's being laterally deformed, and a signal processing circuit connected to said transmitter and said receiver producing a motor control signal upon said receiver's receiving an ultrasonic wave having a characteristic differing from said predetermined value.

* * * * *